Nov. 20, 1945. I. J. REMARK ET AL 2,389,459
METHOD AND APPARATUS FOR APPLYING AN ADHESIVE
COATING TO CORD FABRIC
Filed Jan. 1, 1943 7 Sheets-Sheet 1

INVENTORS
Isadore J. Remark
Vaughn V. Wheeler
BY Evans + McCoy
ATTORNEYS

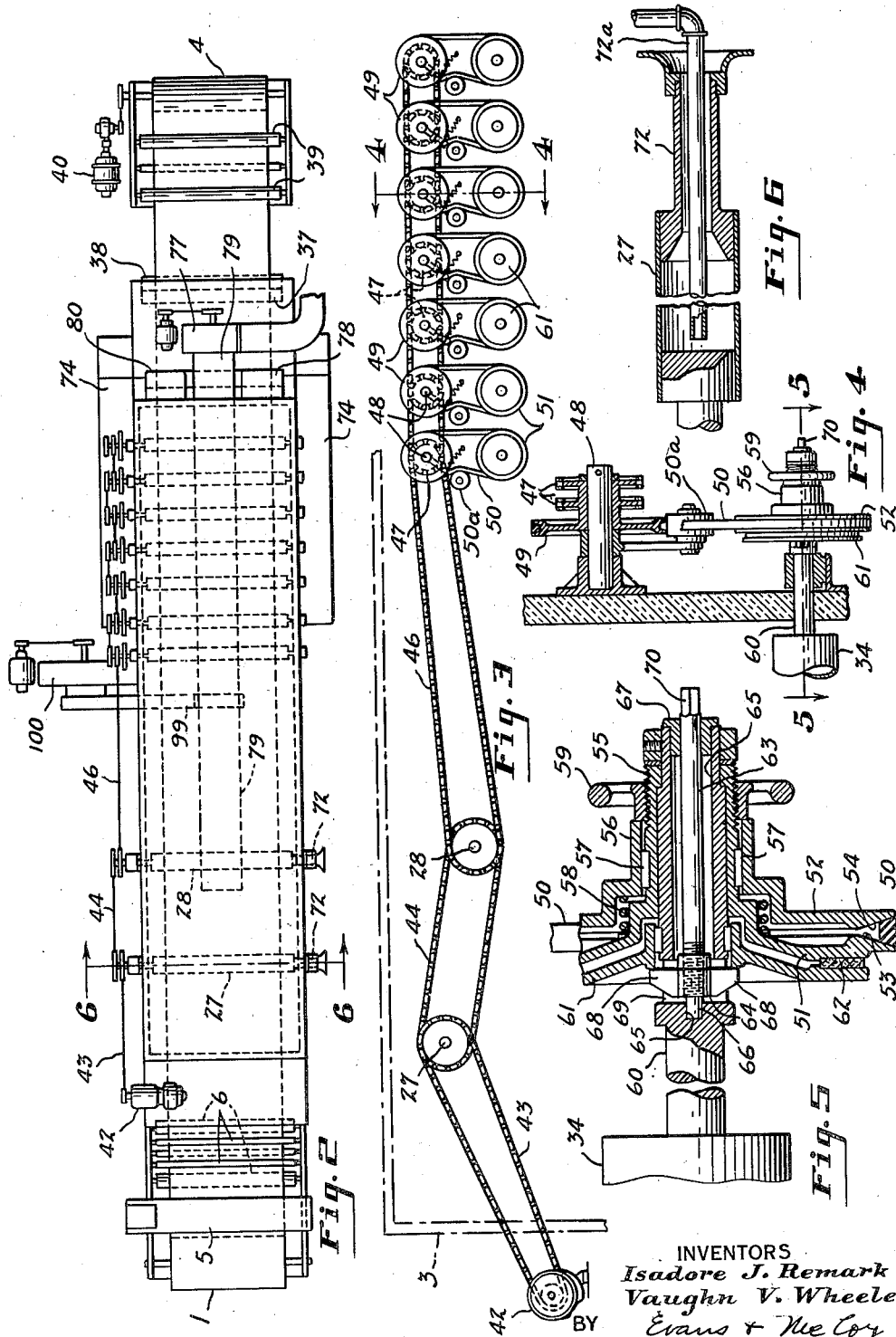

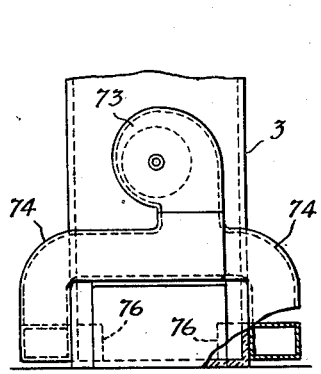
Fig. 7
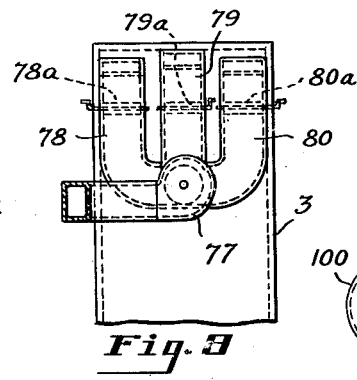
Fig. 8
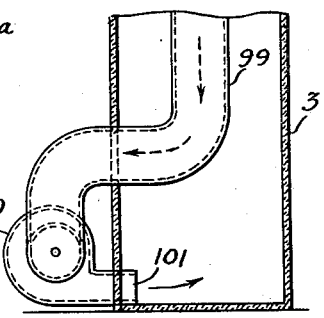
Fig. 9
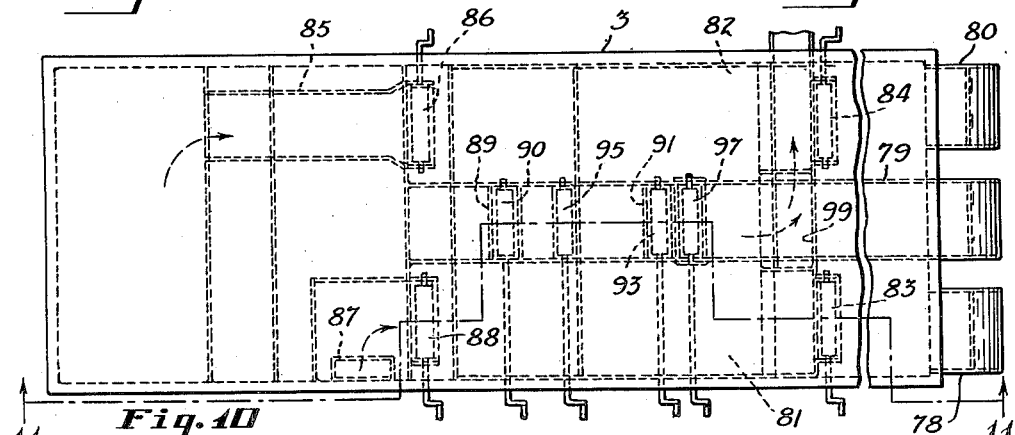
Fig. 10
Fig. 11
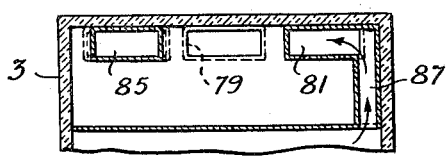
Fig. 12
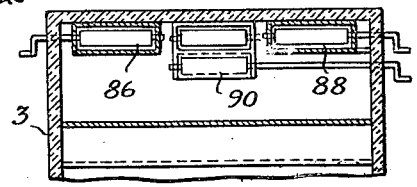
Fig. 13
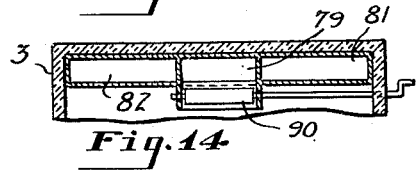
Fig. 14
INVENTORS
Isadore J. Remark
Vaughn V. Wheeler
BY Evans + McCoy
ATTORNEYS Nov. 20, 1945.     I. J. REMARK ET AL     2,389,459
METHOD AND APPARATUS FOR APPLYING AN ADHESIVE
COATING TO CORD FABRIC
Filed Jan. 1, 1943     7 Sheets-Sheet 4

INVENTORS
Isadore J. Remark
Vaughn V. Wheeler
BY Evans + McCoy
ATTORNEYS

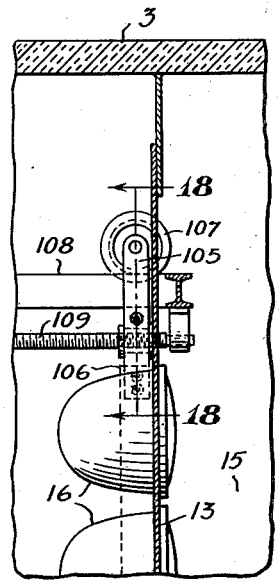
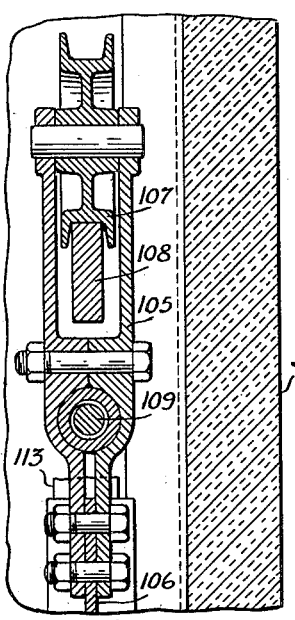
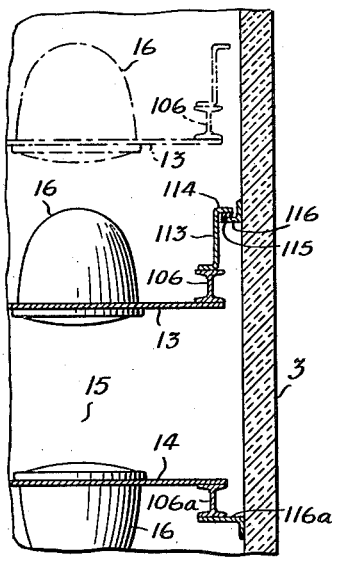
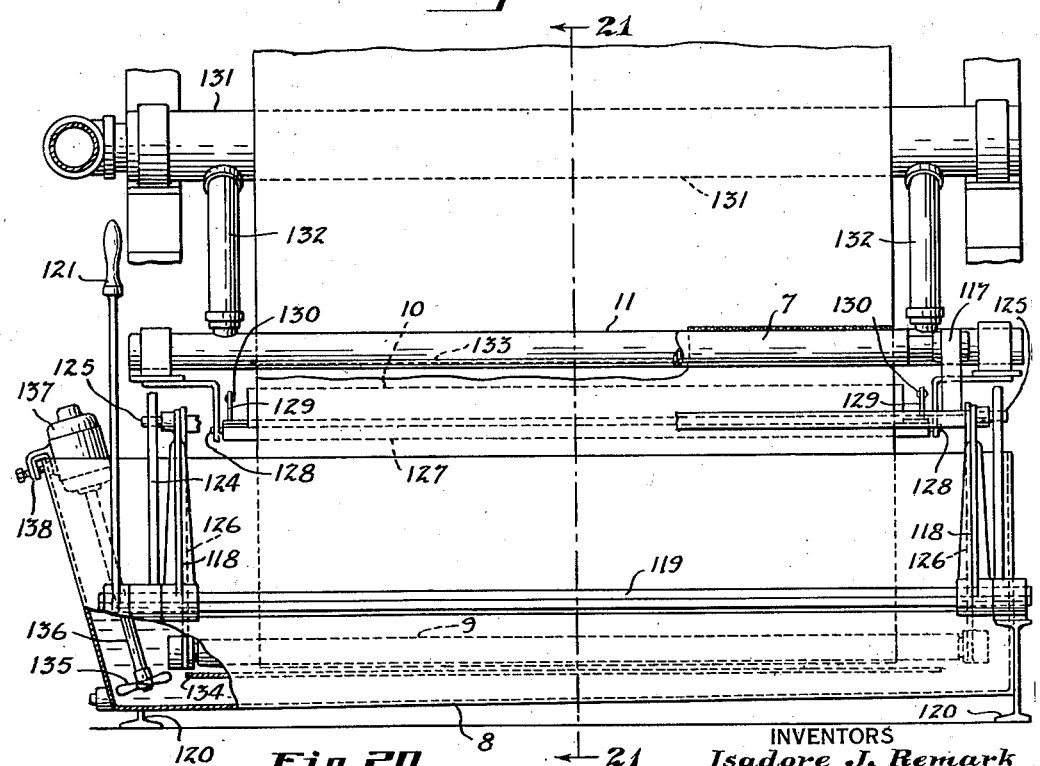

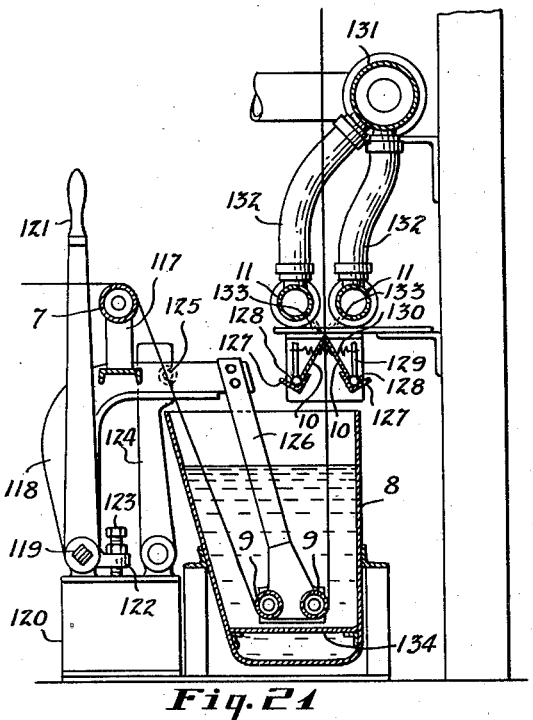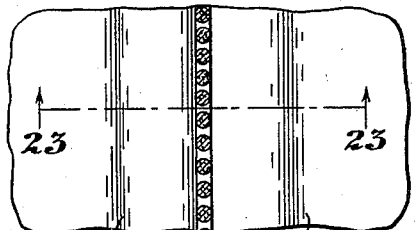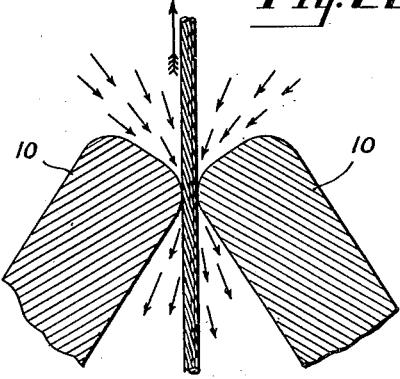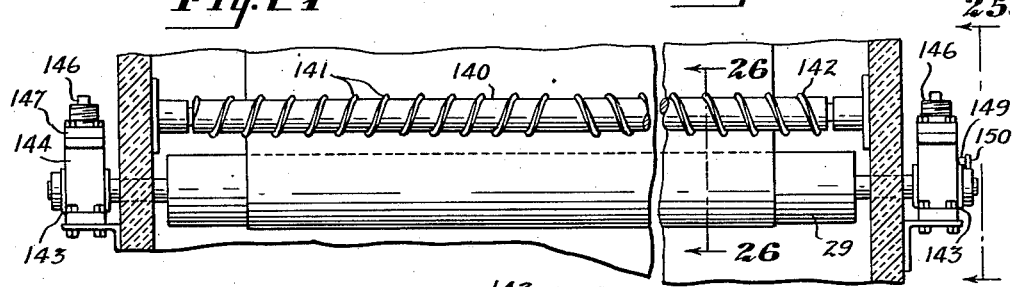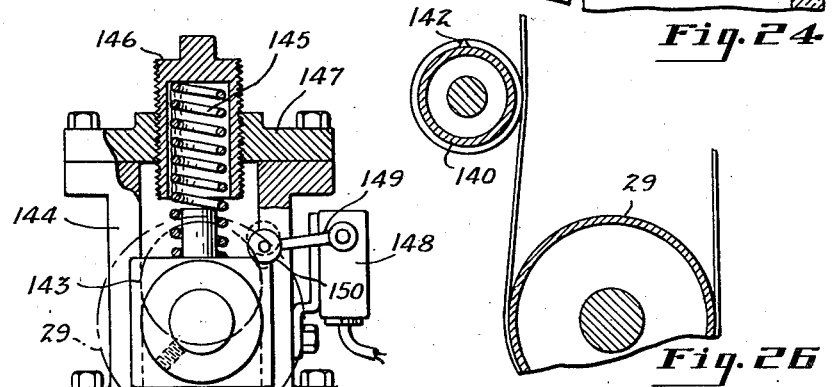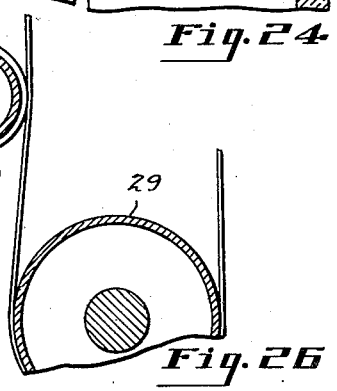

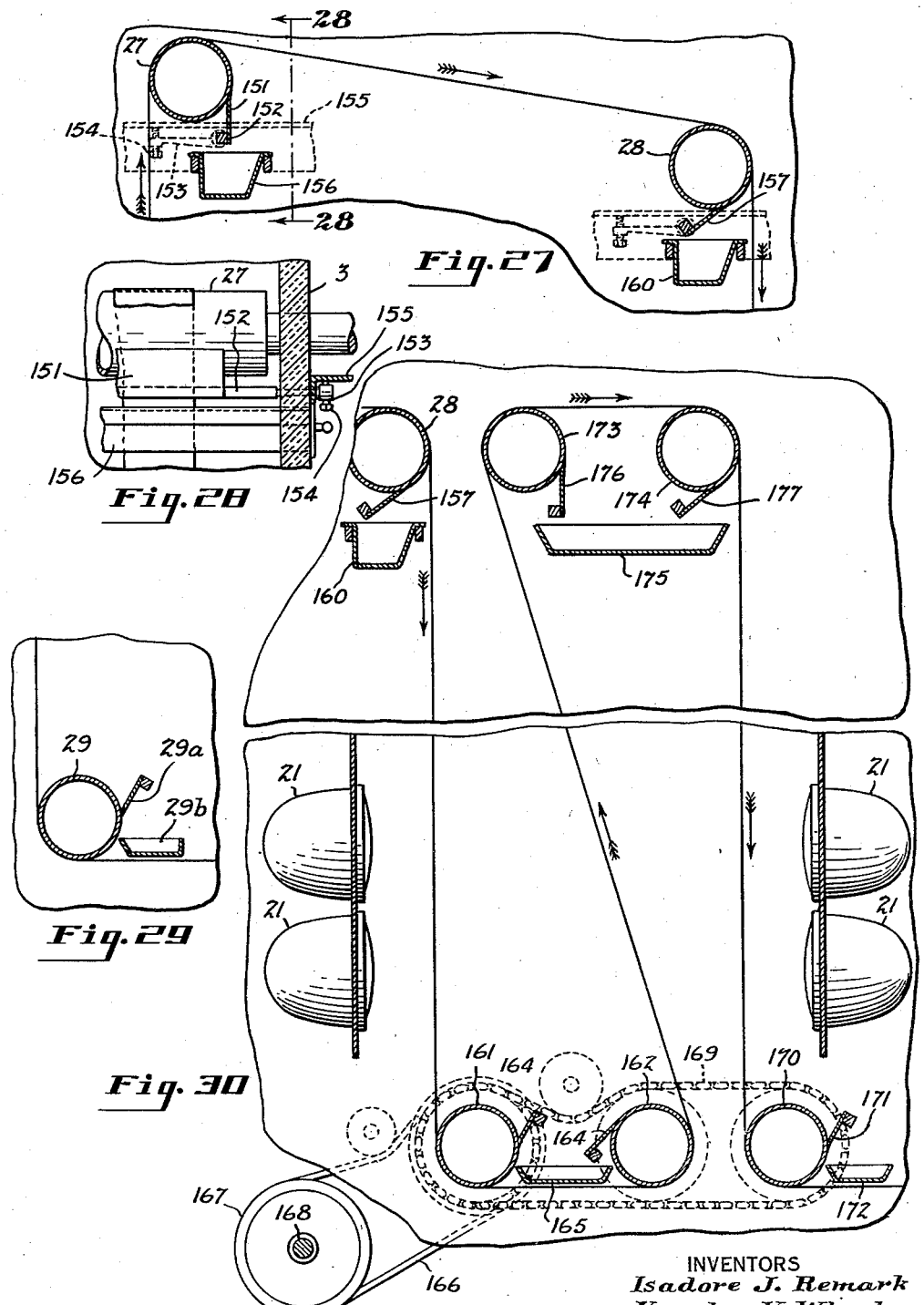

Patented Nov. 20, 1945

2,389,459

UNITED STATES PATENT OFFICE 2,389,459

METHOD AND APPARATUS FOR APPLYING AN ADHESIVE COATING TO CORD FABRIC

Isidore J. Remark and Vaughn V. Wheeler, Akron, Ohio, assignors to The General Tire & Rubber Company, Akron, Ohio, a corporation of Ohio Application January 1, 1943, Serial No. 471,086

7 Claims. (Cl. 117—93)

This invention relates to a method of and apparatus for applying an adhesive dip to tensioned fabric for use in making tires and other things. It has for its principal objects to provide an improved method and apparatus for applying a thin and uniform coating to the fabric while under considerable tension in order to insure superior adhesion between the fabric and subsequently applied rubber compounds.

In applying adhesive dips to fabrics such as rayon tire fabric, difficulty is experienced in obtaining a thin, complete and uniform coating of the fabric for improving the adhesion between the subsequently applied rubber and the fabric. This is particularly necessary where a substantial proportion of the rubber employed is reclaimed or synthetic rubber.

The present invention provides an improved method and means for obtaining these desirable results.

The present invention also provides a means of obtaining a high speed of operation in coating processes of the type in which the coating material is applied to the fabric in a dipping tank in the form of a solution, emulsion or dispersion.

With the above and other objects in view, a preferred embodiment of the invention is illustrated in the accompanying drawings hereinafter described, and the invention is particularly set forth in the appended claims which are intended to include such variations and modifications of the preferred form as will be apparent to one skilled in the art to which the invention pertains.

Reference should be had to the accompanying drawings forming a part of this specification, in which:

Fig. 2 is a top plan view of the apparatus;

Fig. 3 is a side elevation of the mechanism for driving the pulleys in the top portion of the drier housing;

Fig. 4 is a section taken on the line indicated at 4—4 in Fig. 3;

Fig. 5 is a section taken on the line indicated at 5—5 in Fig. 4;

Fig. 6 is a section taken on the line indicated at 6—6 in Fig. 2;

Fig. 7 is a fragmentary front elevation of the lower portion of the drier housing viewed as indicated by the arrows 7—7 in Fig. 1 and showing the main air circulating blower;

Fig. 8 is a fragmentary front elevation of the upper portion of the drier housing viewed as indicated by the arrows 8—8 in Fig. 1 and showing the exhaust fan for withdrawing air from the drier housing;

Fig. 9 is a fragmentary vertical section taken on the line indicated at 9—9 in Fig. 1 and showing a third air circulating fan which is located adjacent the bottom of the drier housing intermediate its ends;

Fig. 10 is a top plan view of the drier housing showing the air ducts and dampers in the upper portion of the housing;

Fig. 11 is a vertical section taken on the broken line indicated at 11—11 in Fig. 10;

Fig. 12 is a vertical section taken on the line indicated at 12—12 in Fig. 11;

Fig. 13 is a vertical section taken on the line indicated at 13—13 in Fig. 11;

Fig. 14 is a vertical section taken on the line indicated at 14—14 in Fig. 11;

Fig. 17 is a fragmentary vertical section showing the hanger for the movable partition in the drier housing;

Fig. 18 is a section taken on the line indicated at 18—18 in Fig. 17;

Fig. 19 is a fragmentary horizontal section taken on the line indicated at 19—19 in Fig. 16;

Fig. 20 is a front elevation of the dipping tank, a portion of the tank being broken away to show the liquid circulating means;

Fig. 21 is a vertical section through the dipping tank taken on the line indicated at 21—21 in Fig. 20;

Fig. 22 is a fragmentary horizontal section showing portions of the presser bars engaging the fabric;

Fig. 23 is a section taken on the line indicated at 23—23 in Fig. 22;

Fig. 24 is a fragmentary vertical section showing one of the tension applying pulleys and an adjacent fabric spreader roll;

Fig. 25 is an end elevation partially in section of one of the spring pressed bearings of a tension pulley viewed as indicated at 25—25 in Fig. 24;

Fig. 26 is a section taken on the line indicated at 26—26 in Fig. 24;

Fig. 27 is a vertical central section on an enlarged scale showing scrapers applied to fabric pulleys at the upper ends of the radiant ovens;

Fig. 28 is a section taken on the line indicated at 28—28 in Fig. 27;

Fig. 29 is a sectional view showing the scraper associated with the lower pulley of the second radiant oven; and Fig. 30 is a vertical section showing a modification in which a plurality of runs for the fabric are provided in the second radiant oven.

Figure 1:
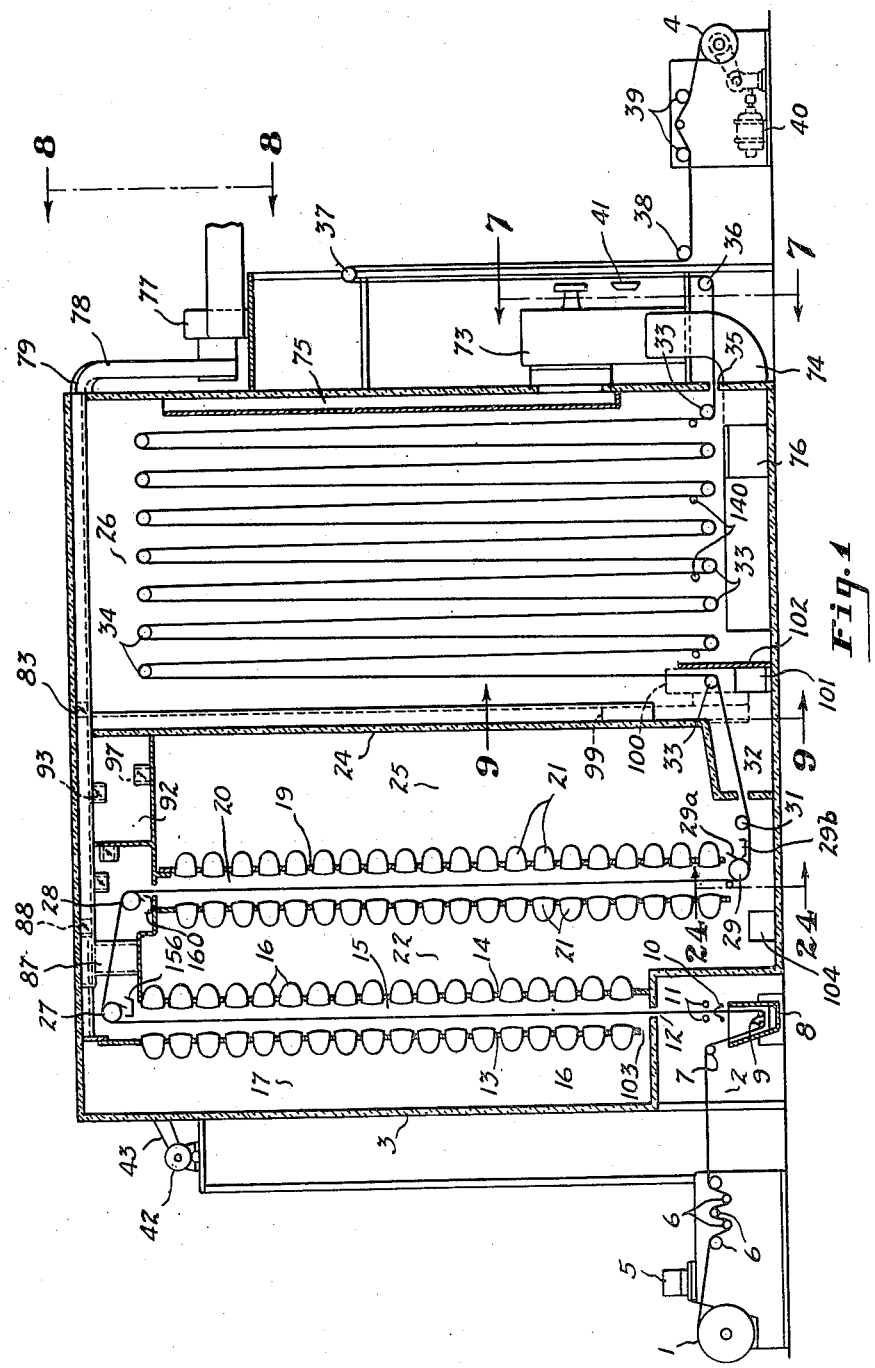
Figure 1 is a longitudinal vertical section through an apparatus embodying the invention and showing the path of travel of the fabric through the dipping tank and drier to the wind-up reel.
Figure 15:
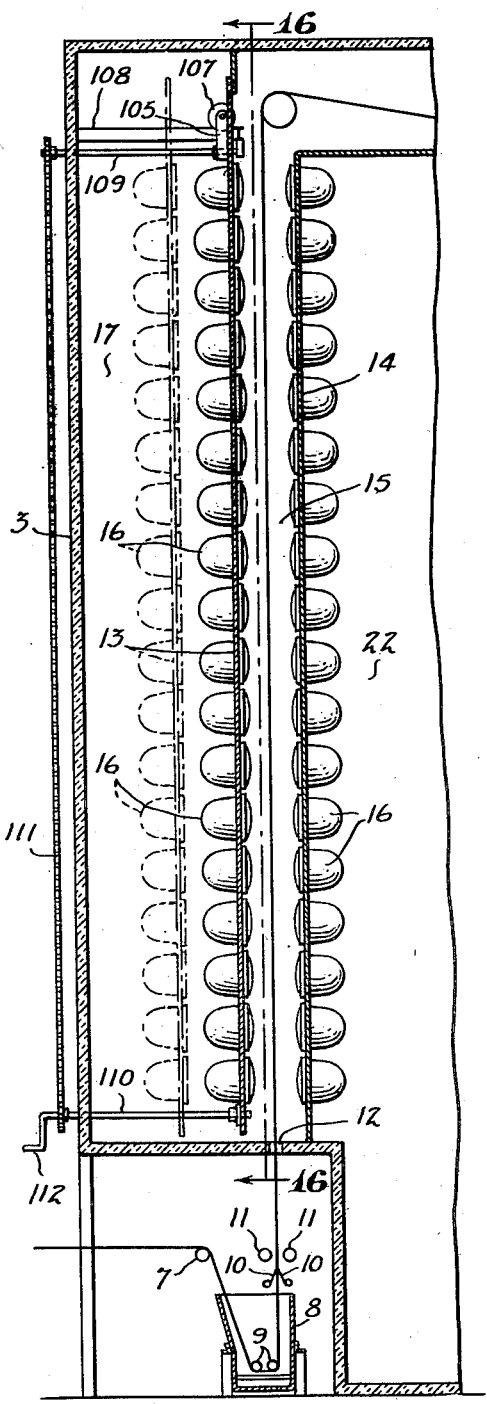
Fig. 15 is a fragmentary central vertical section on an enlarged scale through the dipping tank and the adjacent end of the drier housing.
Figure 16:
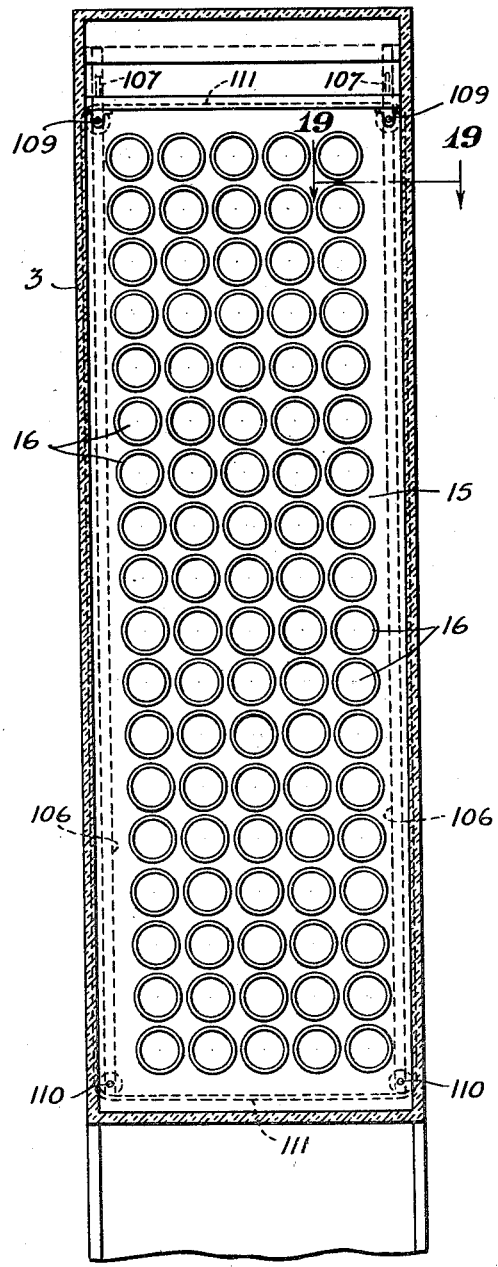
Fig. 16 is a section taken on the line indicated at 16—16 in Fig. 15.

In the accompanying drawings, an apparatus for performing the method of the present invention is shown, in which the fabric in strip form is fed from a suitable reel 1 through a coating device in a recessed end portion of a drier housing 3 and through the housing to a suitable wind-up reel 4. A sewing machine 5 such as commonly used for the purpose may be provided adjacent the reel for joining the ends of successive rolls of fabric to the continuous strip being fed through the apparatus, or such ends may be secured by clamping means or cementing or by other means used in the art for that purpose. The fabric strip is fed from the reel 1 over suitable tensioning rollers 6 and over a guide roller 7 into a dipping tank 8 and under guide rollers 9 mounted in the tank 8 adjacent the bottom thereof. The fabric passes upwardly from the tank 8 between a pair of presser bars 10 and between a pair of air jet pipes 11 into an aperture 12 formed in an upwardly offset portion of the bottom wall of the housing 3 directly above the tank 8.

The interior of the housing 3 is divided into separate passageways or compartments by a series of transverse vertical partitions. Two of these partitions 13 and 14 are located on opposite sides of the opening 12 and form the side walls of an elongated vertically disposed radiant oven 15. Partitions 13 and 14 carry infra-red lamps 16 which are closely spaced throughout the length and width of each partition, and which are provided with reflectors to direct the light rays horizontally against the surfaces of the vertically moving strip of fabric. The partition 13 is spaced from the rear end wall of the housing 3 to provide a passage 17 between the partition 13 and the end wall through which air may be circulated to cool the reflectors of the lamps 16.

A second pair of transverse partitions 18 and 19 form the side walls of a second radiant oven 20, the partitions 18 and 19 having infra-red lamps 21 similar to the lamps 16. The partition 18 is spaced from the partition 14 to provide a vertical air passage 22 between the two radiant ovens 15 and 20. A fifth partition 24 is spaced from the partition 19 to provide a vertical air passage 25 between the radiant oven 20 and the partition 24 and to provide a convection oven 26 in the forward end portion of the housing 3. By maintaining a flow of air through the passages 22 and 25 excessive heating of the reflectors of lamps 16 and 21 may be prevented. Fabric passing upwardly through the radiant oven 15 passes over a pulley 27 adjacent the top of the housing 3 and over a pulley 28 at the upper end of the radiant oven 20. The fabric passes downwardly from the pulley 28 through the oven 20 and under a pulley 29 at the bottom thereof. Thus in passing through the oven 15 the strip of fabric is subjected to the rays of the lamps 16 acting simultaneously upon the opposite surfaces thereof, and in passing through the oven 20 the fabric is subjected to the heat of the lamps 21 mounted in the partitions 18 and 19.

The fabric passes from the pulley 29 through an aperture 32 in the partition 24 into the convection chamber or oven 26. A series of pulleys 33 are mounted adjacent the bottom of the oven 26 and a series of pulleys 34 are mounted adjacent the top thereof. The fabric passes under the first pulley 33 up to the top of the oven over the first upper pulley 34, thence downwardly to the second lower pulley 33, the fabric passing upwardly over the upper pulleys 34 and downwardly under the lower pulleys 33 to provide a series of closely spaced vertical runs within the oven 26. The number of vertical runs in the oven 26 is sufficient to maintain a length of fabric in the oven 26 considerably in excess of the length of fabric in the ovens 15 and 20, so that the heat treatment in the oven 26 is for a longer period of time than the initial heat treatment in the ovens 15 and 20.

From the last of the lower pulleys 33 the fabric passes out through an aperture 35 in the rear end wall of the housing under a pulley 36, and thence upwardly over pulley 37 at some distance above the pulley 36, downwardly under a pulley 38 adjacent the pulley 36 and horizontally through tension rollers 39 to the wind-up reel 4 which is driven by suitable means such as electric motor 40. The vertical run provided by the pulleys 36, 37 and 38 outside the housing provides an inspection run, a lamp 41 being mounted behind the fabric strip with its reflector disposed to direct the rays of light through the fabric, so as to enable an inspector to readily see defects in the fabric such as unevenness in cord spacing or lack of uniformity in the rubber coating.

To keep the fabric moving uniformly through the drier housing under substantial tension and to avoid the application of excessive localized tension to the fabric, certain of the pulleys, preferably those in the upper portion of the housing, are power driven. The drive for the pulleys is best shown in Figs. 2 and 3 of the drawings in which an electric motor 42 is shown driving a sprocket chain 43 which drives the pulley 27, a sprocket chain 44 which drives the pulley 28 from the pulley 27, and a sprocket chain 46 which drives sprockets 47 which are mounted on shafts 48 mounted on the outside of the housing 3 directly above the pulleys 34 and which serve to drive the pulleys 34 through variable speed driving connections which will now be described.

A grooved pulley 49 on each of the shafts 48 is mounted to rotate with the sprockets 47 on the same shaft and drives a belt 50. Each of the belts 50 is engaged by a tightener 50a and runs over a driving pulley composed of two relatively adjustable disks 51 and 52 which have conical faces 53 and 54 engaging the opposite side faces of the belt. The disk 51 has an elongated hub 55 and the disk 52 has a hub 56 which fits upon the hub 55. The two disks are connected to rotate in unison by keys 57 on the hub 55 which engage keyways in the hub 56. A spring 58 is interposed between the disks 51 and 52 and tends to press the two disks apart. The hub 55 projects beyond the end of the hub 56 and is screw threaded to receive a threaded hand wheel 59 which engages the end of the hub 56 to force the disk 52 toward the disk 51 against the action of the spring 58. Each pulley formed by the disks 51 and 52 is mounted upon a projecting shaft 60 of one of the pulleys 34 and the pulley formed by the disks 51 and 52 is normally constrained to rotate with a disk 61 which is keyed to the shaft 60. The disk 61 carries a friction shoe 62 which engages the disk 51 and presses against the disk 51 by means of a screw 63 which has threaded engagement with a nut 64 which is slidably mounted in a bore 65 in the shaft 60. The inner end of the screw 63 has a reduced round portion 66 which is journaled in the shaft 60 at the bottom of the bore 65. The outer end of the screw 63 projects beyond the outer end of the shaft 60 and is journaled in a bearing 67 which fits in the open end of the bore 65. The nut 64 has projections 68 which extend through radial slots 69 in the shaft 60 and engage with the hub of the disk 61. The projecting ends 70 of the screws 63 are squared to receive a suitable tool so that they can be turned to advance the nuts 68 toward the disks 61 and apply pressure to the friction shoes 62, so that the shafts 60 and pulleys 34 are driven by the belts 50 through slip connections provided by the friction shoes 62. By adjusting the hand wheel 59 the disks 53 and 54 can be moved apart or closer together to cause the belt 50 to engage the conical faces 51 and 52 on a smaller or larger diameter. The speed or rotation of the individual pulleys 34 may thus be varied, and in the event of excessive resistance to turning movement, the disk 53 may slip on the disk 61. Varying the speed of rotation of the pulleys 34 in small increments is desirable because of the fact that the fabric may shrink or elongate during the heat treatment.

As the fabric passes through the radiant ovens 15 and 20, a large amount of heat is applied to the fabric by means of the infra-red lamps, which vaporizes most of the water contained in the emulsion or solution absorbed by the fabric. The fabric then passes into the convection oven 26 where it is subjected to heat treatment for a period of time considerably longer than that consumed in the passage through the radiant ovens. In order to more rapidly dry the fabric, means is provided for withdrawing the vapor laden air from the upper ends of the radiant ovens, and in order to prevent excessive heating of the partition walls and of the lamp reflectors, air is circulated through the vertical passages 22, 17 and 25 between and on opposite sides of the radiant ovens. In order to maintain a high temperature in the convection oven 26, means is provided for circulating heated air through this chamber, and in order to avoid waste of heat the air from the passages 22, 17 and 25 is preferably passed through the convection oven 26.

The air circulating and controlling devices are best shown in Figs. 7 through 14 of the drawings. As shown in Figs. 1 and 7, a blower 73 is mounted at the forward end of the housing 3 adjacent the bottom thereof, has its inlet connected to draw air from the interior of the housing, and delivers air through passage 74 straddling the housing and opening into opposite sides thereof adjacent the bottom, the air from the blower 73 being delivered into the housing through suitable heaters 76 which may be regulated to maintain the desired temperature within the oven 26. The fan 73 draws air from the interior of the housing 3 adjacent the top thereof through an inlet passage 75 within the housing. Adjacent the top of the housing 3 adjacent its forward end is mounted a suction fan 77 which has its inlet connected to three pipes 78, 79 and 80, which communicate with the interior of the housing 3. The pipes 78 and 80 open into the convection chamber 26 at the front end of the housing, while the central pipe 79 extends through the housing along the top thereof across the top of the oven 26 and opens to the upper ends of the radiant ovens 15 and 20. The pipes 78, 79 and 80 are controlled by suitable dampers 78a, 79a and 80a exteriorly of the housing 3.

Within the housing 3 a pair of conduits 81 and 82 are mounted on opposite sides of the central conduit 79 and open at their forward ends into the convection oven 26, the outlet ends of the conduits 81 and 82 being controlled by suitable dampers 83 and 84. The conduit 82 has an extension 85 which communicates with the upper end of the first air passage 17, and the extension 85 is controlled by a damper 86. The rear end of the conduit 81 is connected by a vertical pipe 87 to the second air passage 22, the flow from the passage 22 to the conduit 81 being controlled by a damper 88 in the entrance end of the conduit 81. The pipe 79 has an inlet 89 opening to the upper ends of the radiant ovens 15 and 20 and the inlet 89 is controlled by a suitable damper 90. The pipe 79 also has an inlet 91 which opens to a chamber 92 at the upper end of the air passage 25, the inlet 91 being controlled by a suitable damper 93. The chamber 92 has an inlet 96 to the passage 25 which is controlled by a damper 97. The chamber 92 has an opening 98 to a vertical pipe 99 in the chamber 26 which extends downwardly to a suction fan 100 mounted on the floor beside the housing 3 adjacent the partition 24. The fan 100 has a discharge outlet 101 which delivers into the bottom of the oven 26 adjacent the partition 24, a short vertical baffle 102 being provided to direct the air entering through the fan outlet 101 upwardly into the oven independently of the air entering through the heaters 76. Air enters the lower end of the radiant oven 15 through the opening 12 and into the lower end of the passage 17 through an opening 103 in the lower end of the partition 13. Air enters the lower ends of the vertical air passages 22 and 25 and the lower end of the radiant oven 20 through an opening 104 in the side wall of the housing 3, the lower ends of the partitions 18 and 19 being spaced from the floor of the housing 3 to permit free passage of air from the opening 104 into the oven 20 and passage 25.

In the normal operation of the drier, air from the radiant ovens 15 and 20 is drawn through the pipe 79 to the suction fan 77, while air from the passages 17, 22 and 25 is drawn through the pipes 81 and 82 to the vertical pipe 99, and through the blower 100 to the oven 26. By suitable regulation of the dampers, however, part of the vapor laden air from the radiant ovens may be circulated through the convection oven or part of the air passing through the vertical air passages may be discharged to the atmosphere with the vapor laden air from the radiant ovens. During normal operation the air from the ovens 15 and 20 is discharged to the atmosphere and air from passages 17, 22 and 25 is circulated through the oven 26, dampers 93 and 95 will be closed and dampers 86, 88, 90 and 97 may be regulated to control the relative rate of air flow in the radiant ovens and air passages. If it is desired to discharge all air from the radiant ovens 15 and 20 and the passage 17 to the atmosphere and air from the passages 22 and 25 to the convection oven, the dampers 83, 84, 93 and 95 will be closed. It will be apparent that the dampers provided may be adjusted to direct some or all of the air from radiant ovens 15 and 20 to the oven 26 if desired, or some or all of the air from the passages 17, 22 and 25 to the atmosphere and to vary the rate of flow of air in the various passageways.

As best shown in Figs. 15 through 19, the partition 13 may be mounted for movement bodily within the housing 3 to widen the space between the partitions 13 and 14 sufficiently to enable an operator to gain access to the lamps mounted in the two partitions. As shown in the views above referred to, the partition 13 is suspended from a pair of hangers 105 which are attached to the webs of H bars 106 which are attached to opposite side edges of the partition 16. The hangers 105 carry grooved rollers 107 at their upper ends which are mounted to roll on horizontal rails 108. The partition is moved bodily from its operative position toward the rear wall of the housing by means of upper and lower screws 109 and 110, the screws 109 and 110 being horizontally disposed, the screws 109 being threaded into the hangers 105, and the screws 110 being threaded into suitable nuts carried by the lower end of the partition. The two screws 109 and 110 are connected for rotation in unison by means of a sprocket chain 111 and the lower screw 110 is provided with a hand crank 112 by which it may be turned. By rotating the screws 109 and 110 the partition 13 may be retracted or advanced to its operative position. The partition 19 is preferably mounted in the same way as the partition 13 to afford access to the lamps 21.

As best shown in Fig. 19, a sealing bar 113 is attached to each of the H bars 106, the bar 113 being provided with a flange 114 which carries a sealing strip 115 which is engageable with a vertical angle bar 116 attached to the adjacent side wall of the housing 3 when the partition 13 is in its operative position. The H bars 106a of the partitions 14 are attached to vertical angle bars 116a attached to the walls of the housing 3.

As best shown in Figs. 20 and 21 of the drawings, the guide rollers 7 over which the fabric is guided into the dipping tank 8 is mounted on standards 117 which are carried by L-shaped arms 118 which are attached at their lower ends to a pivot shaft 119 journaled in a suitable base member 120. When the arms 118 are in operative position, the portions thereof which are attached to the shaft 119 are substantially vertical and the portions thereof to which the standards 117 are attached are disposed horizontally and extend over the rear edge of the tank 8. A handle 121 is fixed to the shaft 119 so that the L-shaped frame members 118 may be swung about the axis of the shaft 119 by means of the handle 121. Movement of the pivoted frame in a forward direction is limited by means of a lug 122 on the handle 121 which carries a set screw 123 engageable with the base 120. The forward limit of movement of the handle 121 and frame 118 is determined by the adjustment of the set screw 123 and this is the operative position in which the free end portion of the L-shaped arm 118 projects horizontally over the edge of the tank 8. In order to hold the arms 118 in their operative position and against rearward swinging movement hooks 124 pivoted to the base 120 are engageable with pins 125 on the arms 118. The free ends of the arms 118 have downwardly extending arms 126 rigidly attached thereto and the arms 126 provide supports for the guide rollers 9 within the tank 8. When the arms 118 are released by releasing the hooks 124, they may be swung rearwardly to lift the rollers 9 out of the tank 8 to a position clear of the tank to permit cleaning of the rollers.

As best shown in Fig. 21, the presser bars 10 are attached to angle bars 127 which are carried by horizontal pivots 128. Vertically extending arms 129 are attached to the pivots and these arms are connected by a spring 130 which serves to press the bars 10 against the upwardly moving strip of fabric. The bars 10 may be provided with rounded corners, as best shown in Fig. 23, and these bars pressing against the fabric issuing from the tank serve to wipe off and squeeze out excess liquid during passage of the fabric and return the liquid to the tank.

As best shown in Figs. 20 and 21, the parallel horizontal air pipes 11 are supplied with air under pressure from a supply pipe 131 which has branches 132 to the pipes 11 which are located directly above the presser plates 10. Each of the pipes 11 has a narrow elongated slot 133 which is so positioned as to direct a stream of air against the fabric directly above the point of engagement of the bars 10 with the fabric. The action of the air jets and of the presser bars prevents the carrying of excess liquid into the drier housing so that only a thin coat of the dip is left on the surface of the cords which are under substantial tension during the dipping operation.

The presser bars 10 wipe off the excess liquid on opposite side faces of the fabric and the air blasts directed against opposite sides of the fabric at the point of engagement of the bars 10 forces excess liquid from between the cords so that by the combined action of the air blasts and the presser bars the cords are completely coated with a thin film of adhesive material but liquid in excess of that necessary to provide the desired adhesion is expelled. By this method the amount of adhesive material applied to the fabric is only that which is required to provide the individual cords with the thin uniform coating necessary for strong adhesion with the subsequently applied rubber compounds.

As best shown in Fig. 20, the dipping tank 8 has a partition 134 below the rollers 9 which extends across the tank 8 a short distance above its bottom, but which terminates short of the opposite ends of the tank. Liquid is circulated through the tank 8 by means of a propeller 135 at the end of a bearing tube 136 attached to an electric motor 137 which is attached to an end wall of the tank 8 by means of a bracket 138, the propeller 135 being attached to the shaft of the motor. Rotation of the propeller 135 maintains a constant movement of liquid endwise of the tank beneath the partition 134 and sufficient movement of the liquid over the partition to maintain the suspension during the dipping operation.

In order to prevent distortion of the fabric strip during heat treatment, the fabric is engaged by a spreader roller 140 adjacent lower guide pulleys in the housing 3. Each spreader roller 140 is provided with helical ribs 141 and 142 of opposite angularity extending from the center thereof towards the ends. The engagement of the ribs 141 and 142 with the fabric strip serves to exert lateral tension on the fabric and hold the strip flat.

The lower pulleys 29 and 33 are preferably idler pulleys and some or all of the bearing blocks 143 for these pulleys may be resiliently held in place so that they may yield if the fabric is subjected to abnormal or dangerous tension. As best shown in Figs. 24 and 25, each take-up pulley is mounted in bearing blocks 143 which are movable vertically in guide members 144 secured to the base of the housing. The bearing blocks 143 are pressed downwardly by coil springs 145 which are disposed above the blocks with their lower ends engaging the blocks and with their upper ends seated in inverted externally threaded cup shaped members 146 which are screwed into cap plates 147 secured to the tops of the guide members 144. By adjusting the cup shaped members 146 in the cap plates 147, the tension of each spring 145 may be increased or decreased. The springs 145 serve to maintain the bearing blocks 143 in their bottom position during normal operation. If for any reason the tension on the fabric strip becomes abnormally great the tension in the fabric is relieved by vertical movement of the lower rollers and compression of the springs 145. The vertical movement of the lower pulleys upon tightening up of the fabric may be utilized to stop the driving motors and cut off the heating lamps whenever an excessive tension is applied to the fabric. As shown in Fig. 25, a suitable stop switch 148 may be mounted on one of the guide members 144 adjacent one of the bottom pulleys and this switch is provided with an arm 149 provided with a roller 150 which is engaged by a collar on the shaft of pulley 28 upon a predetermined upward movement of the pulley.

The first guide pulleys engaged by the fabric strip in its passage through the housing 3 contact with the fabric before the coating is dried to a non-tacky state and it is therefore desirable that means be provided to prevent adhesion of the fabric to these pulleys and to keep these pulleys clean. In the apparatus shown in Fig. 1, this is accomplished by chilling the pulleys 27 and 28 by circulating water through them so that they will condense moisture on their surface from the vapor laden atmosphere of the cabinet. This condensation is then scraped from the pulley surface thus leaving a clean, chilled pulley having a slight moist film to which neither the fabric nor material from it will adhere to the pulley surface.

As shown in Fig. 6 of the drawings, the pulley 27 is a hollow cylinder which has a tubular shaft 72 extending through the wall of the housing 3, the bore of the shaft 72 being of sufficient diameter to receive a water pipe 72a through which water may be delivered to the interior of the pulley. As shown in Fig. 2, the pulley 28 is constructed in a manner similar to the pulley 27.

As shown in Figs. 27 and 28 of the drawings, the pulley 27 is engaged by a scraper 151 which is attached to a pivot shaft 152 which has an arm 153 at one end thereof provided with a set screw 154 at its free end which engages with a bar 155 attached to a side wall of the housing. The arm 153 is preferably outside the housing 3. The scraper 151 is formed of resilient sheet metal and is held against the pulley 27 by means of the arm 153. Adjustment of the set screw 154 varies the pressure exerted by the scraper 151 against the surface of the pulley 27. A suitable pan 156 is placed beneath the scraper 151 to catch material scraped from the pulley. The second guide pulley 28 disposed at the top of the radiant oven 20 is provided with a similar scraper 157 and a suitable pan 160 is mounted beneath the scraper 157 to catch the material scraped off the surface of the pulley 28.

As shown in Fig. 29, the pulley 29 may be provided with a scraper 29a and a pan 29b may be mounted to catch the scrapings.

Fig. 30 of the drawings shows a modification of the invention in which the fabric is guided down adjacent the partition 18 in the oven 20 to subject one face of the fabric to the heat of the lamps carried by the partition 18, upwardly to the top of the oven 20 and downwardly adjacent the partition 19 to subject the opposite sides of the fabric to the heat of the lamps carried by the partition 19. At the bottom of the oven 20 the fabric passes over two pulleys 161 and 162 which are spaced apart sufficiently to permit scrapers 163 and 164 to be mounted to engage the opposed surfaces of the pulleys. A suitable pan 165 may be mounted beneath the scrapers and above the fabric to catch the material scraped from the pulleys. Where lower guide rollers are employed which are retarded by scrapers, it may be desirable to drive these rollers and this may be done by providing a sprocket chain 166 from a sprocket 167 on a drive shaft 168 and running over a sprocket on the shaft of the pulley 161 and a sprocket chain 169 to the pulley 162.

The fabric passes under a third pulley 170 at the bottom of the oven 20 and from the oven 20 to the oven 26. The pulley 170 may also be driven by the chain 169. A scraper 171 engaging the pulley 170 and a pan 172 beneath the scraper may be provided. A pair of pulleys 173 and 174 may be provided at the top of the oven 20, a collecting pan 175 may be mounted beneath the pulleys 173 and 174, and scrapers 176 and 177 may be mounted to engage the two pulleys.

The high vapor content of the atmosphere within the ovens is utilized to assist in preventing accumulations of adhesive material on the guide pulleys. The chilling of the pulleys 27 and 28 causes moisture to continuously condense upon the surfaces of the pulleys and this moisture tends to soften any adhesive material transferred from the fabric to the surfaces of the pulleys and to lessen the adhesion of such material to the pulley so that transfer of adhesive material from the fabric to the pulley is lessened. Also the mixture of liquid condensate and adhesive material on the surface of the pulley is more easily removed by the scraper.

It is to be understood that the pulleys 29, 161, 162, 170, 173, and 174 shown in Figs. 29 and 30 may also be water cooled.

In treating fabric by the method of the present invention a suitable water emulsion or dispersion of casein with natural or synthetic latex or rubber is provided in the dipping tank 8. The fabric dip contains a suitable wetting agent to increase its wetting of the fabric. The rubber content may include a substantial proportion of synthetic and reclaimed rubber. Other solutions, emulsions or dispersions, preferably with a wetting agent in small amount, also may be used. With dips employing casein, the prolonged heat treatment after drying appears to advantageously change the characteristics of the material.

The fabric in passing through the dipping tank absorbs several times its weight of emulsion. For example, it has been found that tire fabric weighing about 1.3 lbs. per running yard will absorb approximately its own weight of water together with the material in the dip, and it will be apparent that a very considerable amount of heat is required to evaporate this water content. If the fabric is dried during passage through an oven, the heat must be regulated to avoid damage to the fabric and the length of time required for drying has heretofore been such that the rate of travel of the fabric has had to be quite slow.

By the method of the present invention a rapid input of heat is effected in the radiant ovens which serves to rapidly vaporize the water absorbed by the fabric, and the rapid evaporation and withdrawal of the vapor laden air from the radiant ovens serves to keep the temperature within a safe limit. After passing through the radiant ovens, the fabric with most of the moisture expelled therefrom passes into the convection oven where the air is maintained at a temperature of about 300° F. to complete the drying and heating action. The drying and heating of the rubber causes the dip to be firmly bonded to the fabric and, in the case of tire fabric, the rubber applied subsequently by calendering adheres very firmly to the fabric. The method of the present invention is advantageous for treating various types of fabric, such as the cotton fabric commonly used in pneumatic tires and is particularly advantageous in the case of rayon fabrics used in tires, since difficulty has heretofore been experienced in obtaining sufficiently strong adhesion between the rubber and fabric.

The use of infra-red lamps is advantageous because the energy of the infra-red rays is converted into heat at the surface of the fabric because of the dark color of the dip. During passage through the radiant oven 15, heat is very rapidly consumed by evaporation of water so that a large amount of heat may be applied without subjecting the fabric to a temperature high enough to cause damage. The current to the lamps 21 in the second radiant oven may be regulated so that the heat input is less rapid than in the oven 15.

A serious difficulty in drying of dipped fabric is the tendency of the heated tacky coating to adhere to the guide pulleys, particularly the pulleys first engaged by the fabric after passing through the dipping tank. In the present invention this difficulty is greatly reduced by the rapid evaporation of moisture in the oven 15 by the lamps 16 which greatly reduces the tackiness of the coating before the fabric contacts the pulley 27. The tendency of the pulleys 27 and 28 to pick off coating material from the surface of the fabric is further reduced by the chilling of these pulleys which causes condensation of moisture on the surfaces of the pulleys, the moisture serving to reduce adhesion and enabling the pulley surfaces to be kept clean by the scrapers. By the use of the infra-red lamps and chilled pulleys satisfactory operation at high speed is made possible.

It has been found that in order to obtain strong adhesion of the rubber to the fabric it is necessary to subject the rubberized fabric to heat for a period of time after the moisture has been evaporated. In passing through the convection oven 26 the fabric is subjected to substantially uniform heat for a period of time considerably greater than the time of passage through the radiant ovens. This final heating completes the drying and effects a firm bond between the coating material and fabric.

The arrangement of heating compartments or ovens enables the dipping and drying operation to be performed at a high rate of speed. Since the time of passage of the fabric through a compartment or oven is a function of the speed of travel and the distance traveled, it follows that the speed of travel of the fabric through the dipping tank and ovens of the present invention is dependent somewhat upon the lengths of the passages through the various ovens. While the rapid input of heat in the radiant ovens permits an increased speed of travel, it will be apparent that lengthening of the ovens 15 and 20 will permit of greater speed of travel of the fabric. In an installation now in operation which corresponds substantially to the installation herein illustrated, the height of the housing 3 is about twenty-eight feet and the speed of travel of the fabric is from 40 to 60 feet per minute. The time of passage through the radiant ovens 15 and 20 is a small fraction of the time required to pass through the convection oven 26.

It is to be understood that variations and modifications of the specific devices herein shown and described for purposes of illustration, may be made without departing from the spirit of the invention.

What we claim is:

1. The method of applying a thin coating of an adhesive containing rubber to spaced cords in sheet form which comprises applying a liquid emulsion containing rubber in suspension to the moving cords, scraping surplus liquid from the sides of the cords, and projecting a jet of air against each side of the sheet of cords at an angle to the sheet and in a direction counter to the cord movement and at the point of scraping to remove surplus liquid from between the cords at the same time that the surplus liquid is scraped from the sides thereof.

2. The combination with means for applying a surplus of liquid material to spaced cords arranged in sheet form, a pair of scrapers yieldingly held against opposite sides of the sheet of cords in substantially opposed relation and means for applying a stream of air against opposite sides of the sheet at substantially the same point of contact of said scraper blades with said cords to force surplus material from between the cords and along the cords in a direction opposite to their direction of movement.

3. The combination with a tank adapted to apply liquid to a moving sheet of spaced cords of a pair of space blades arranged at an acute angle with respect to the sheet of cords and contacting said cords at opposite sides of the sheet under yielding pressure, said scraper blades extending generally in the direction of movement of the cords, tubular means for applying a stream of air against opposite sides of the cords and in a reverse relation with respect to the direction of movement of the cords whereby air is forced between the cords at the point of contact of said scraper blades with said sheet of cords to remove surplus material from between the cords during travel of said cords by the said scraper blades.

4. The method of coating cords with a thin layer of adhesive containing rubber which consists in applying a surplus of an aqueous emulsion containing rubber to a moving sheet of spaced cords, removing surplus material from the sides of the cords by a scraping action and simultaneously removing surplus material from between the cords at the point of application of said scraping operation by means of a simultaneously applied stream of air which drives said surplus material along the cords in a direction opposite to their direction of movement.

5. The method of treating cords with an adhesive material containing rubber which consists in applying a surplus of the adhesive material in liquid form to the cords, while traveling in sheet form, removing the surplus material from the sides and from between the cords during their movement, heating said material to vaporize liquid from the cords and passing the cords over a chilled guide roller that is subjected to the vapor removed from said cords by the heating step to thereby condense said vapor on the surface of said guide roll, removing the condensate from the surface of the roll by a scraping action and collecting the liquid condensate.

6. In a process of applying an adhesive coating containing rubber to a cord tire fabric, the step which comprises of preventing adhesion of material carried by the cords to a guide roller which consists in subjecting the guide roller to an atmosphere laden with aqueous vapor, chilling the guide roll sufficiently to condense vapor from said atmosphere on the surface of said guide roll and scraping the condensate from the surface of said roll during movement of the fabric over said guide roller.

7. The method of preventing objectionable deposits of dipping material on the surface of a guide roller for conducting a sheet of cord tire fabric to which an adhesive coating containing rubber has been applied which consists in subjecting the guide roller to an atmosphere laden with aqueous vapor, chilling said guide roll to condense moisture from said atmosphere on said roll during its operation and removing condensate from the surface of said guide roll by a scraping action and separately collecting the material thus removed from the surface of said roll.

ISIDORE J. REMARK.
VAUGHN V. WHEELER.